United States Patent
Thuillard et al.

(10) Patent No.: US 9,874,880 B2
(45) Date of Patent: Jan. 23, 2018

(54) DEVICE AND METHOD FOR CONTROLLING OPENING OF A VALVE IN AN HVAC SYSTEM

(71) Applicant: BELIMO HOLDING AG, Hinwil (CH)

(72) Inventors: Marc Thuillard, Uetikon am See (CH); Forest Reider, Wetzikon ZH (CH)

(73) Assignee: BELIMO HOLDING AG, Hinwil (CH)

( * ) Notice: Subject to any disclaimer, the term of this patent is extended or adjusted under 35 U.S.C. 154(b) by 0 days.

(21) Appl. No.: 14/771,002

(22) PCT Filed: May 14, 2014

(86) PCT No.: PCT/EP2014/001298
§ 371 (c)(1),
(2) Date: Aug. 27, 2015

(87) PCT Pub. No.: WO2014/183868
PCT Pub. Date: Nov. 20, 2014

(65) Prior Publication Data
US 2016/0054741 A1    Feb. 25, 2016

(30) Foreign Application Priority Data
May 16, 2013    (CH) .......................... 0975/13

(51) Int. Cl.
*G05B 15/02*    (2006.01)
*G05D 7/06*    (2006.01)
(Continued)

(52) U.S. Cl.
CPC .......... *G05D 7/0635* (2013.01); *F16K 31/002* (2013.01); *F24F 11/006* (2013.01);
(Continued)

(58) Field of Classification Search
CPC . G05D 7/0635; G05D 23/1919; F24F 11/008; F24F 11/0012; F24F 11/006; F24F 11/0076; F16K 31/002; G05B 15/02
See application file for complete search history.

(56) References Cited

U.S. PATENT DOCUMENTS 6,792,767 B1 *   9/2004   Pargeter ................. F24F 3/153
                                                       236/44 C
7,637,315 B2    12/2009   Ichinose et al.
(Continued)

FOREIGN PATENT DOCUMENTS

CA    2811775 A    5/2012
CN    1940797 A    4/2007
(Continued)

OTHER PUBLICATIONS

International Search Report for PCT/EP2014/001298 dated Feb. 13, 2015.
(Continued)

*Primary Examiner* — Charles E Anya
(74) *Attorney, Agent, or Firm* — Sughrue Mion, PLLC

(57) ABSTRACT

For controlling the opening of a valve (10) in an HVAC system (100) to regulate the flow φ of a fluid through a thermal energy exchanger (2) of the HVAC system (100) and adjust the amount of energy E exchanged by the thermal energy exchanger (2), determined are the flow φ through a valve (10) and the temperature difference $\Delta T = T_{in} - T_{out}$ between the supply temperature $T_{in}$ of the fluid entering the thermal energy exchanger (2) and the return temperature $T_{out}$ of the fluid exiting the thermal energy exchanger (2). The opening of the valve (10) is controlled depending on the flow φ and the temperature difference ΔT. For example, the opening of the valve (10) is controlled depending on a
(Continued)

control criterion $c=f(\varphi,\Delta T)$, calculated from the flow $\varphi$ and the temperature difference $\Delta T$.

14 Claims, 9 Drawing Sheets

(51) Int. Cl.
    *F24F 11/00*     (2006.01)
    *G05D 23/19*     (2006.01)
    *F16K 31/00*     (2006.01)
    *F25B 25/00*     (2006.01)

(52) U.S. Cl.
    CPC ........ *F24F 11/008* (2013.01); *F24F 11/0012* (2013.01); *F24F 11/0076* (2013.01); *G05B 15/02* (2013.01); *G05D 23/1919* (2013.01); *F24F 2011/0063* (2013.01); *F24F 2011/0082* (2013.01); *F25B 25/005* (2013.01)

(56) References Cited

U.S. PATENT DOCUMENTS

| | | |
|---|---|---|
| 2006/0005554 A1 | 1/2006 | Okada |
| 2007/0074864 A1 | 4/2007 | Ichinose et al. |
| 2010/0186941 A1 | 7/2010 | Ichinose et al. |
| 2011/0054701 A1 | 3/2011 | Wang et al. |
| 2011/0265443 A1* | 11/2011 | Ansari .................... F02C 7/057 60/39.23 |
| 2013/0151019 A1* | 6/2013 | Federspiel ............... F24F 11/00 700/276 |
| 2013/0204439 A1* | 8/2013 | Scelzi .................... G06Q 10/00 700/276 |
| 2014/0083673 A1* | 3/2014 | Thuillard ............ F24D 19/1015 165/299 |
| 2014/0097367 A1* | 4/2014 | Burt .................... F24D 19/1015 251/129.04 |
| 2015/0176931 A1* | 6/2015 | Aeberhard ............... F28F 27/00 165/200 |
| 2016/0252284 A1* | 9/2016 | Kibo ........................ F24F 11/02 62/115 |
| 2017/0254553 A1* | 9/2017 | Leal ........................ G05B 15/02 |

FOREIGN PATENT DOCUMENTS

| | | |
|---|---|---|
| CN | 1940799 A | 4/2007 |
| CN | 101256020 A | 9/2008 |
| CN | 201262443 Y | 6/2009 |
| CN | 102022800 A | 4/2011 |
| DE | 35 33 160 A1 | 3/1986 |
| GB | 2 430 732 A | 4/2007 |
| WO | 2012/065275 A1 | 5/2012 |
| WO | 2013/034358 A1 | 3/2013 |

OTHER PUBLICATIONS

Communication dated Mar. 31, 2017, from the State Intellectual Property Office of People's Republic of China in counterpart Application No. 201480028391.6.

* cited by examiner

DEVICE AND METHOD FOR CONTROLLING OPENING OF A VALVE IN AN HVAC SYSTEM

CROSS REFERENCE TO RELATED APPLICATIONS

This application is a National Stage of International Application No. PCT/EP2014/001298 filed May 14, 2014, claiming priority based on Swiss Patent Application No. 00975/13, filed May 16, 2013, the contents of all of which are incorporated herein by reference in their entirety.

FIELD OF THE INVENTION

The present invention relates to a device and a method for controlling opening of a valve in a Heating, Ventilating and Air Conditioning (HVAC) system. Specifically, the present invention relates to a method and a control device for controlling the opening of a valve in an HVAC system to regulate the flow of a fluid through a thermal energy exchanger of the HVAC system and to thereby adjust the amount of energy exchanged by the thermal energy exchanger.

BACKGROUND OF THE INVENTION

By regulating the flow of fluid through thermal energy exchangers of an HVAC system, it is possible to adjust the amount of energy exchanged by the thermal energy exchangers, e.g. to adjust the amount of energy delivered by a heat exchanger to heat or cool a room in a building or the amount of energy drawn by a chiller for cooling purposes. While the fluid transport through the fluid circuit of the HVAC system is driven by one or more pumps, the flow is typically regulated by varying the opening or position of valves, e.g. manually or by way of actuators. It is known that the efficiency of thermal energy exchangers is reduced at high flow rates where the fluid rushes at an increased rate through the thermal energy exchangers, without resulting in a significant increase in energy exchange.

U.S. Pat. No. 6,352,106 describes a self-balancing valve having a temperature sensor for measuring the temperature of a fluid passing through the valve. According to U.S. Pat. No. 6,352,106, the range and thus the maximum opening of the valve are adjusted dynamically, depending on the measured temperature. The opening of the valve is modulated based on a stored temperature threshold value, the current fluid temperature, and a position command signal from a load controller. Specifically, the opening range of the valve is set periodically by a position controller, based on a temperature threshold value stored at the position controller, the current fluid temperature, and the difference between the previously measured fluid temperature and the current fluid temperature. U.S. Pat. No. 6,352,106 further describes an alternative embodiment with two temperature sensors, one placed on the supply line and the other one placed on the return line, for measuring the actual differential temperature over the load, i.e. the thermal energy exchanger. According to U.S. Pat. No. 6,352,106, in this alternative embodiment, the threshold temperature is a threshold differential temperature across the load determined by system requirements of the load. Thus, U.S. Pat. No. 6,352,106 describes controlling the flow based on a change in fluid temperature or a change in a differential temperature over the load. Accordingly, the flow is controlled based on a comparison of determined temperature changes to fixed threshold temperatures or threshold differential temperatures, respectively, which must be predefined and stored at the valve's position controller. Consequently, to avoid incorrect and inefficient settings of the valve, it must be ensured, at initial installation time of the system and whenever thermal energy exchangers are replaced with new models, that the stored threshold temperatures or threshold differential temperatures, respectively, match the type and design parameters of thermal energy exchangers used in the HVAC system.

Document DE 10 2009 004319 discloses a method for operating a heating or cooling system, whereby the temperature difference between supply temperature and return temperature or only the return temperature is controlled, so that hydraulic balancing of each heat exchanger of the heating or cooling system is achieved depending on temperature values. The balancing is newly adjusted and optimized at each changing of the operation conditions. Although a temperature difference between supply temperature and return temperature is used for control, there is neither a flow meter disclosed, nor the measurement of an energy flow through the heat exchanger, nor the determination of the functional dependency of the energy flow from the mass flow of the heating or cooling medium.

SUMMARY OF THE INVENTION

It is an object of this invention to provide a method and a control device for controlling the opening of a valve in an HVAC system, which method and a control device do not have at least some of the disadvantages of the prior art. In particular, it is an object of the present invention to provide a method and a control device for controlling the opening of a valve in an HVAC system to regulate the flow of a fluid through a thermal energy exchanger for efficient operation of the thermal exchanger.

According to the present invention, these objects are achieved through the features of the independent claims. In addition, further advantageous embodiments follow from the dependent claims and the description.

According to the present invention, the above-mentioned objects are particularly achieved in that for controlling opening (or position or size of orifice) of a valve in an HVAC system to regulate the flow $\varphi$ of a fluid through a thermal energy exchanger of the HVAC system and thereby adjust the amount of energy E exchanged by the thermal energy exchanger, the flow $\varphi$ through the valve is measured and a temperature difference $\Delta T = T_{in} - T_{out}$ is determined between a supply temperature $T_{in}$ of the fluid entering the thermal energy exchanger and a return temperature $T_{out}$ of the fluid exiting the thermal energy exchanger. The opening of the valve is controlled depending on the flow $\varphi$ and the temperature difference $\Delta T$. Specifically, using the flow $\varphi$ and the temperature difference $\Delta T = T_{in} - T_{out}$, a control criterion $c = f(\varphi, \Delta T)$ is determined, using a function $f(\varphi, \Delta T)$ that requires an increase of the value of the flow $\varphi$ with an increase of the value of the temperature difference $\Delta T = T_{in} - T_{out}$ for the control criterion c to remain constant, and the opening of the valve is controlled depending on a comparison of the control criterion $c = f(\varphi, \Delta T)$ to a threshold value. For example, the control criterion $c = f(\varphi, \Delta T)$ is calculated using the function $$c = \frac{\varphi}{\Delta T}.$$

In an embodiment, a control criterion $$c = \frac{\varphi^\alpha}{\Delta T^\beta}$$

is determined using the flow φ, the temperature difference $\Delta T = T_{in} - T_{out}$, and adjustment parameters α>0, β>0; and the opening of the valve is controlled depending on a comparison of the control criterion $$c = \frac{\varphi^\alpha}{\Delta T^\beta}$$

to a threshold value.

In an embodiment, the control criterion $$c = \frac{\varphi^\alpha}{\Delta T^\beta}$$

is an adaptive control criterion and the adjustment parameters α, β are determined using environmental characteristics of a space having arranged therein the thermal energy exchanger, including air temperature, air flow, air humidity, and/or supply temperature. Alternatively, the adjustment parameters α, β are stored values which are set, for example, after installation of the HVAC system, e.g. depending on system measurements performed during a calibration phase.

While this control criterion $c=f(\varphi,\Delta T)$ or $c=f(\varphi^\alpha,\Delta T^\beta)$, respectively, may depend to some extent on the type of thermal energy exchanger, it is also influenced by characteristics of the environment where the thermal energy exchanger is located, e.g. by the flow and humidity of the air in the environment of the thermal energy exchanger. The threshold value is determined and stored during an initial learning phase and defines with regards to the control criterion a limit beyond which the thermal energy exchanger is considered to no longer operate efficiently, as it no longer achieves sufficient energy exchange.

For example, in case of the thermal energy exchanger of the HVAC system being a heat exchanger, the opening of the valve is controlled to regulate the flow φ of the fluid through the heat exchanger of the HVAC system. The control criterion is determined while the opening of the valve is being increased or decreased. The opening of the valve is controlled by comparing the control criterion to a threshold value and by stopping the increase or decrease of the opening when the control criterion is at (or above) the threshold value. In case of the thermal energy exchanger of the HVAC system being a chiller, the opening of the valve is controlled to regulate the flow φ of the fluid through the chiller of the HVAC system. The opening of the valve is controlled by comparing the control criterion to an upper threshold value and a lower threshold value, and by stopping the decrease or increase of the opening when the control criterion is above the upper threshold value or below the lower threshold value, respectively.

In a preferred embodiment, particularly for calculating the control criterion, the supply temperature $T_{in}$, the return temperature $T_{out}$, and the flow φ through the valve are measured at the same time.

In an embodiment, the humidity and/or air flow are measured in the space where the thermal energy exchanger is arranged, the opening of the valve is controlled depending on the humidity and/or the air flow, and/or the threshold value is adjusted based on the humidity and/or the air flow.

In further embodiments, the opening of the valve is controlled depending on the supply temperature $T_{in}$, and/or the threshold value is adjusted based on the supply temperature $T_{in}$.

In a further embodiment, control signal levels, which are used to control an actuator of the valve for opening the valve, are calibrated by setting the control signal to a defined maximum value for placing the valve to a maximum opening position, reducing the value of the control signal to reduce the opening of the valve while determining the control criterion, and assigning the maximum value of the control signal to the setting of the valve opening at which the control criterion becomes equal or greater than a threshold value.

In addition to the method of controlling the opening of a valve in an HVAC system, the present invention also relates to a control device for controlling the opening of the valve to regulate the flow φ of a fluid through a thermal energy exchanger of the HVAC system and adjust the amount of energy E exchanged by the thermal energy exchanger, whereby the control device comprises a processor configured to calculate a control criterion $c=f(\varphi,\Delta T)$ using a measurement of the flow φ through the valve (10) and a temperature difference $\Delta T=T_{in}-T_{out}$, determined between a supply temperature $T_{in}$ of the fluid entering the thermal energy exchanger (2) and a return temperature $T_{out}$ of the fluid exiting the thermal energy exchanger (2), and using a function $f(\varphi,\Delta T)$ that requires an increase of the value of the flow φ with an increase of the value of the temperature difference $\Delta T=T_{in}-T_{out}$ for the control criterion c to remain constant; and to control the opening of the valve (10) depending on a comparison of the control criterion $c=f(\varphi,\Delta T)$ to a threshold value.

Furthermore, the present invention also relates to a computer program product comprising a non-transient computer readable medium having stored therein computer program code configured to direct a processor of a control device for controlling opening of a valve in an HVAC system. Specifically, the computer program code is configured to direct the processor of the control device for controlling the opening of the valve in the HVAC system and adjust the amount of energy exchanged by the thermal energy exchanger by: calculating a control criterion $c=f(\varphi,\Delta T)$ using a measurement of the flow φ through the valve (10) and a temperature difference $\Delta T=T_{in}-T_{out}$, determined between a supply temperature $T_{in}$ of the fluid entering the thermal energy exchanger (2) and a return temperature $T_{out}$ of the fluid exiting the thermal energy exchanger (2), and using a function $f(\varphi,\Delta T)$ that requires an increase of the value of the flow φ with an increase of the value of the temperature difference $\Delta T=T_{in}-T_{out}$ for the control criterion c to remain constant; and controlling the opening of the valve (10) depending on a comparison of the control criterion $c=f(\varphi,\Delta T)$ to a threshold value.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
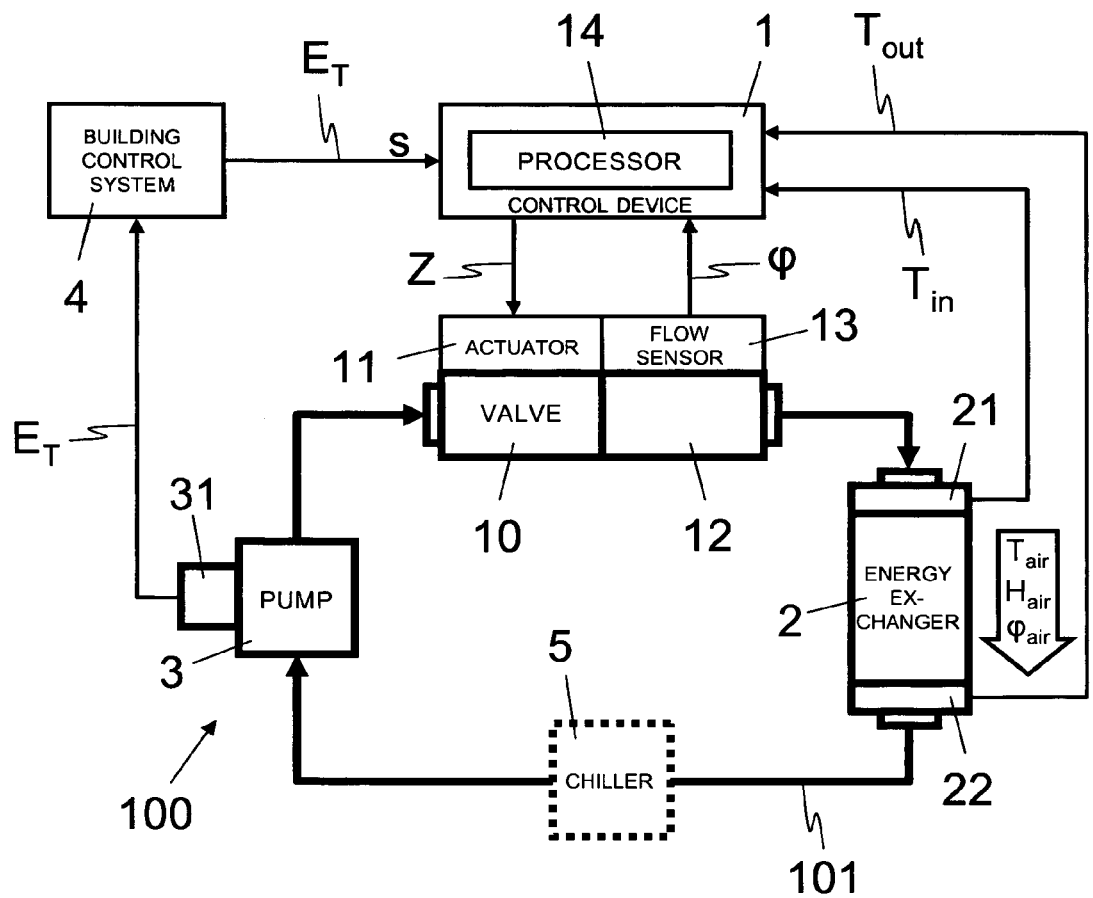
FIG. 1: shows a block diagram illustrating schematically an HVAC system with a fluid circuit comprising a pump, a valve, and a thermal energy exchanger, and a control device for controlling the opening of the valve to regulate the amount of energy exchanged by the thermal energy exchanger.

In FIG. 1, reference numeral 100 refers to an HVAC system with a fluid circuit 101 comprising a pump 3, a valve 10, a thermal energy exchanger 2, e.g. a heat exchanger for heating or cooling a room, and optionally—or as an alternative—a further thermal energy exchanger in the form of a chiller 5, which are interconnected by way of pipes. The valve 10 is provided with an actuator 11, e.g. an electrical motor, for opening and closing the valve 10 and thus controlling the flow through the fluid circuit 101, using different positions (or sizes of orifice) of the valve 10. Further, the pump(s) 3 may themselves vary the flow through the fluid circuit 101. As illustrated schematically, the HVAC system 100 further comprises a building control system 4 connected to the valve 10 or actuator 11, respectively. One skilled in the art will understand that the depiction of the HVAC system 100 is very simplified and that the HVAC system 100 may include a plurality of fluid circuits 101, having in each case one or more pumps 3, valves 19, thermal energy exchangers 2, and optional chillers 5. For example, the fluid is a liquid heat transportation medium such as water and the HVAC system 100 further includes a heater for heating the liquid.

As illustrated schematically in FIG. 1, the thermal energy exchanger 2 is provided with two temperature sensors 21, 22 arranged at the inlet of the thermal energy exchanger 2, for measuring the supply temperature $T_{in}$ of the fluid entering the thermal energy exchanger 2, and at the exit of the thermal energy exchanger 2, for measuring the return temperature $T_{out}$ of the fluid exiting the thermal energy exchanger 2. One skilled in the art will understand that the temperature sensors 21, 22 may be arranged in different locations, for example, the temperature sensor 21 for measuring the supply temperature $T_{in}$ may be arranged at the valve 10 or at the exit of a heater.

The fluid circuit 101 further comprises a flow sensor 13 for measuring the flow φ, i.e. the rate of fluid flow, through the valve 10 or fluid circuit 101, respectively. Depending on the embodiment, the flow sensor 13 is arranged in or at the valve 10, or in or at a pipe section 12 connected to the valve 10. For example, the flow sensor 13 is an ultrasonic sensor or a heat transport sensor.

In FIG. 1, reference numeral 1 refers to a control device for controlling the valve 10 or the actuator 11, respectively, to adjust the opening (or position or size of orifice) of the valve 10. Accordingly, the control device 1 regulates the flow φ, i.e. the rate of fluid flow, through the valve 10 and, thus, through the thermal energy exchanger 2. Consequently, the control device 1 regulates the amount of thermal energy exchanged by the thermal energy exchanger 2 with its environment. Depending on the embodiment, the control device 1 is arranged at the valve 10, e.g. as an integral part of the valve 10 or attached to the valve 10, or the control device 1 is arranged at a pipe section 12 connected to the valve 10.

The control device 1 comprises a processor 14, e.g. an operational microprocessor with program and data memory or another programmable circuit. The control device 1 comprises computer program code configured to direct the processor 14 or another programmable circuit of the control device 1 to perform various functions, as will be explained later in more detail. The computer program code is stored on a non-transient computer-readable medium which is connected to the control device 1 in a fixed or removable fashion. One skilled in the art will understand, however, that in alternative embodiments, functional modules configured to perform said functions can be implemented partly or fully by way of hardware components. Moreover, in alternative embodiments, the processor 14 is arranged in different components of the HVAC system 100, e.g. in the actuator 11, the flow sensor 13, or the building control system 4.

As is illustrated in FIG. 1, the flow sensor 13 is connected to the control device 1 for providing timely or current-time measurement values of the flow φ to the control device 1. Furthermore, the control device 1 is connected to the actuator 11 for supplying control signals Z to the actuator 11 for controlling the actuator 11 to open and/or close the valve 10, i.e. to adjust the opening (or position or size of orifice) of the valve 10.

Moreover, the temperature sensors 21, 22 of the thermal energy exchanger 2 are connected to the control device 1 for providing to the control device 1 timely or current-time measurement values of the supply temperature $T_{in}$ and the return temperature $T_{out}$, of the fluid entering or exiting the thermal energy exchanger 2, respectively.

Preferably, the control device 1 is further connected to the building control system 4 for receiving from the building control system 4 control signals s and/or parameters, e.g. user settings for a desired room temperature, and/or measurement values, such as the load demand (e.g. from zero BTU to maximum BTU) or transport energy $E_T$ currently used by the pump 3 to transport the fluid through the fluid circuit 101, as measured by energy measurement unit 31. Based on the transport energy $E_T$ used by a plurality of pumps 3 and received at the building control system 4 from a plurality of fluid circuits 101 (through transmission in push mode or retrieval in pull mode), the building control system 4 is configured to optimize the overall efficiency of the HVAC system 100, e.g. by setting the flow φ through the valve 10 of one or more fluid circuits 101 based on the total value of the transport energy $E_T$ used by all the pumps 3 of the HVAC system 100. In an alternative or additional embodiment, an energy sensor arranged at the pump 3 is connected directly to the control device 1 for providing the current measurement value of the transport energy $E_T$ to the control device 1.

In an embodiment, the HVAC system 100 further comprises sensors which are arranged in the space where the thermal energy exchanger 2 is located, for example a humidity sensor, for measuring the humidity $H_{air}$ of the air in the room where the thermal energy exchanger 2 is arranged, a temperature sensor for measuring the air temperature $T_{air}$ in the space around the heat exchanger 2, and/or an air flow sensor, for measuring the air flow $\varphi_{air}$ across the thermal energy exchanger 2.

In the following paragraphs, described with reference to FIGS. 2a and 2-11 are possible sequences of steps performed by the processor 14 of the control device 1 for controlling the opening (or position or size of orifice) of the valve 10 to regulate the flow co through the thermal energy exchanger 2.

Figure 2A:
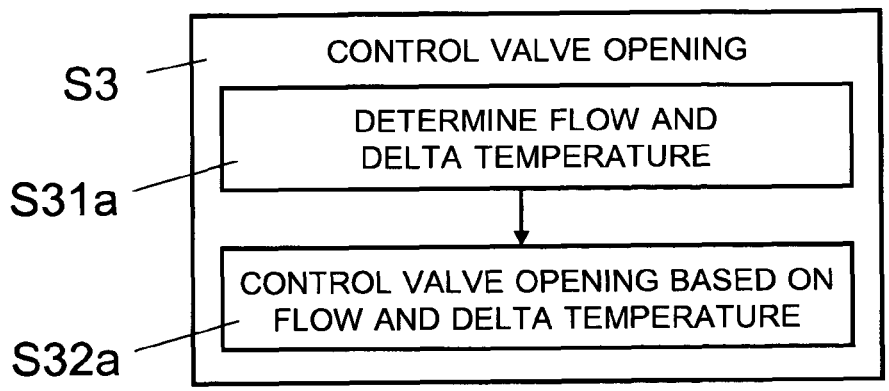
FIG. 2a: shows a flow diagram illustrating an exemplary sequence of steps for controlling the opening of the valve.
Figure 2:
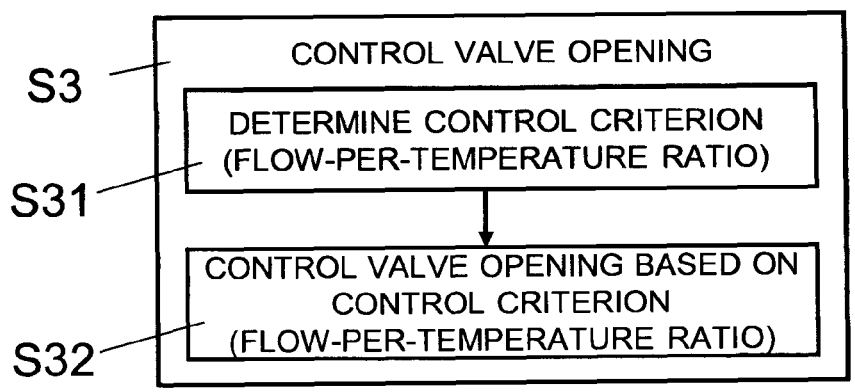
FIG. 2: shows a flow diagram illustrating an exemplary sequence of steps for controlling the opening of the valve.

As illustrated in FIGS. 2 and 2a, in step S3, the control device 1 controls the opening of the valve 10, e.g. in response to control signals s received from the building control system 4 to meet demands requested by the building control system 4. Specifically, in step S31a of FIG. 2a, the processor 14 determines the flow φ through the valve 10, as later described in the context of step S311, and the processor 14 determines the temperature difference ΔT between the supply temperature $T_{in}$ and the return temperature $T_{out}$, as later described in the context of step S312. Specifically, in step S32a, the processor 14 controls the opening of the valve 10, in response to control signals s received from the building control system 4 to meet demands requested by the building control system 4, depending on the flow φ and the temperature difference ΔT, i.e. depending on a control criterion c=f(φ,ΔT) calculated from the flow φ and the temperature difference ΔT. In particular, the processor 14 controls the opening of the valve 10 depending on the flow φ and the temperature difference ΔT using one or more threshold values.

Figure 7:
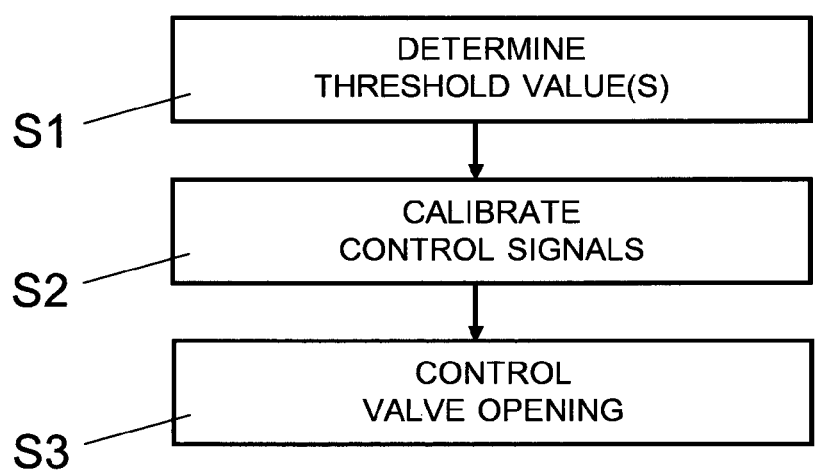
FIG. 7: shows a flow diagram illustrating an exemplary sequence of steps for determining threshold values and/or calibrating control signals used for controlling the opening of the valve.

As illustrated in FIG. 7, step S3, for controlling the valve opening, is preceded by optional step S1, for determining the one or more threshold values.

Figure 8:
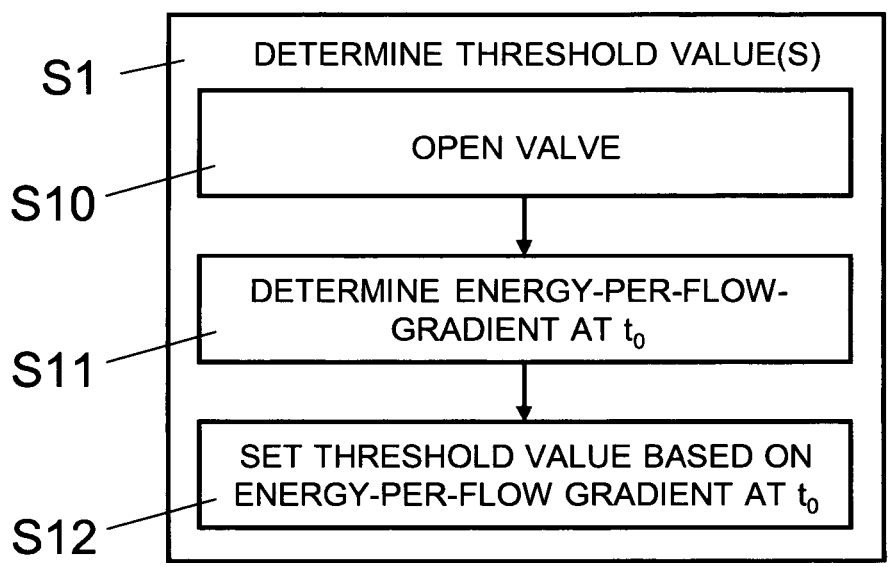
FIG. 8: shows a flow diagram illustrating an exemplary sequence of steps for determining threshold values used for controlling the opening of the valve.

In the embodiment illustrated in FIG. 8, for determining the threshold value(s) for controlling the valve opening, in step S10, the processor 14 opens the valve from an initial closed position. Specifically, in this initial phase, the valve 10 is opened to a defined opening level and/or by a defined increment of the value of the control signal Z.

In step S11, during this initial phase, the processor 14 determines the energy-per-flow gradient $$\frac{dE_0}{d\varphi_0}$$

Figure 12:
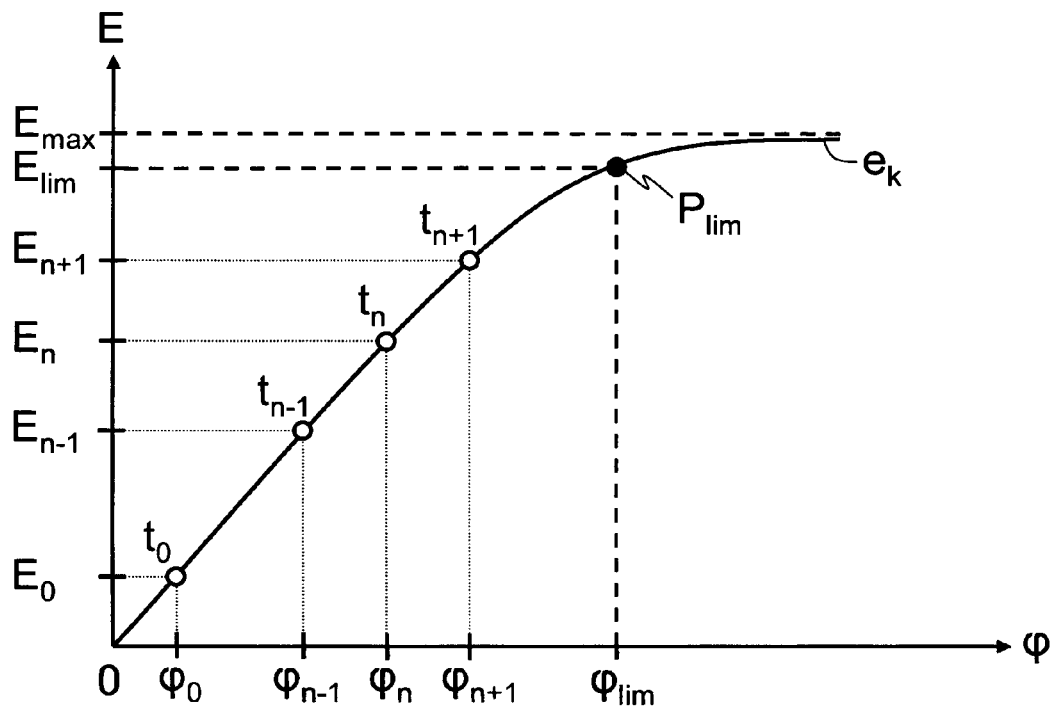
FIG. 12: shows a graph illustrating an example of the energy-per-flow curve with different levels of flow and corresponding amounts of energy exchanged by the thermal energy exchanger.

(or the first derivative of E(φ)) at an initial point in time $t_0$ (see FIG. 12).

Figure 13:
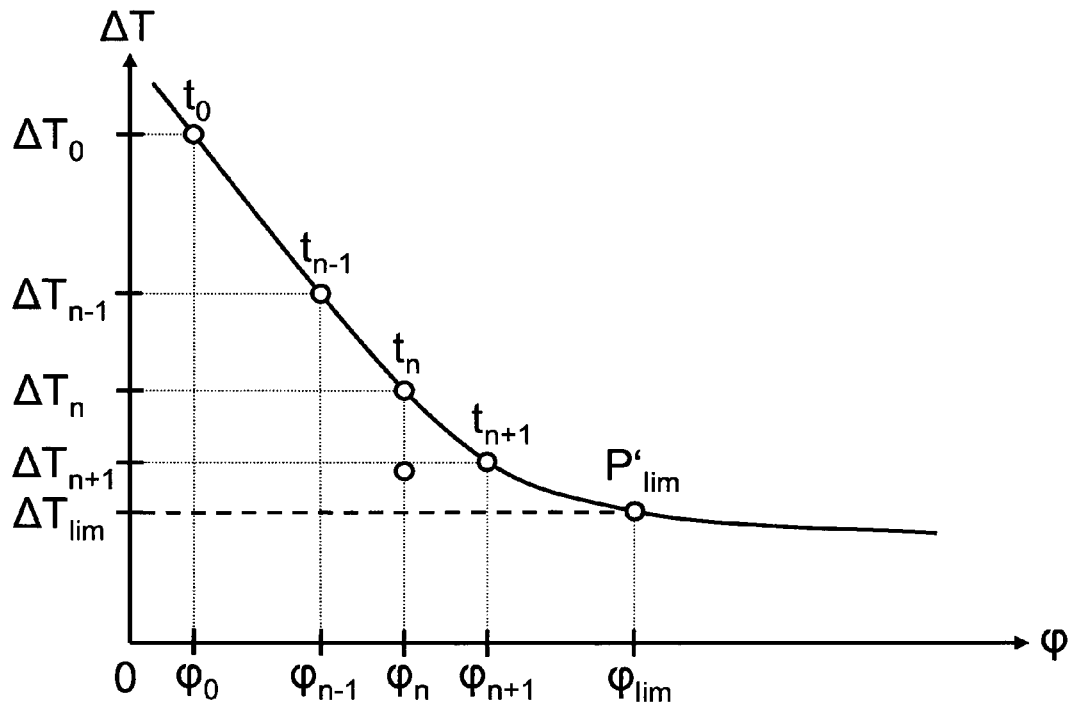
FIG. 13: shows a graph illustrating an example of the temperature-difference-per-flow curve with different levels of flow and corresponding values of temperature-difference.

In step S12, the processor 14 sets the threshold value(s) based on the energy-per-flow gradient $$\frac{dE_0}{d\varphi_0}$$

determined for the initial point in time $t_0$. For example, for a heat exchanger, a slope threshold value $K_{lim}$ is set to a defined percentage C of the energy-per-flow gradient $$K_{lim} = C \cdot \frac{dE_0}{d\varphi_0},$$

e.g. C=10%. Correspondingly, for a chiller 5, a lower slope threshold value $K_L$ and an upper slope threshold value $K_H$ are set in each case to a defined percentage C, D of the energy-per-flow gradient $$K_L = D \cdot \frac{dE_0}{d\varphi_0},$$

e.g. D=1%, and $$K_H = C \cdot \frac{dE_0}{d\varphi_0},$$

e.g. C=10%. Alternatively, the slope thresholds $K_{lim}$, $K_L$, $K_H$ are defined (constant) values assigned specifically to the thermal energy exchanger 2, e.g. type-specific constants entered and/or stored in a data store of the control device 1 or the thermal energy exchanger 2. In an embodiment, the processor 14 is configured to adjust the slope threshold values $K_{lim}$, $K_L$, $K_H$ based on current environmental conditions including humidity $H_{air}$, temperature $T_{air}$, and flow $\varphi_{air}$ of the air in the room where the thermal energy exchanger 2 is arranged. In a further embodiment, the processor 14 is configured to adjust the slope threshold values $K_{lim}$, $K_L$, $K_H$ based on the supply temperature $T_{in}$. As illustrated in FIG. 12, the slope threshold value $K_{lim}$, defines a point $P_{lim}$ where for a flow $\varphi_{lim}$ and amount of energy $E_{lim}$ exchanged by the thermal energy exchanger 2, the energy-per-flow gradient $$\frac{dE_{lim}}{d\varphi_{lim}}$$

is equal to the slope threshold value $K_{lim}$,

As illustrated in FIG. 13, as $E=\Delta T \cdot \varphi$, at flow $\varphi_{lim}$, point $P_{lim}$ of the energy-per-flow curve corresponds to $P'_{lim}$ of the temperature-difference-per-flow curve where the temperature difference is $\Delta T = \Delta T_{lim}$.

Using the threshold values $\varphi_{lim}$ and $\Delta T_{lim}$, the processor 14 calculates a threshold value for the criterion $c=f(\varphi,\Delta T)$ to control the valve opening, e.g. the threshold value $$L = \frac{\varphi_{lim}}{\Delta T_{lim}}$$

using a flow-per-temperature ratio as the control criterion $$c = f(\varphi, \Delta T) = \frac{\varphi}{\Delta T}.$$

Correspondingly, for a chiller 5, the processor 14 calculates threshold values for the criterion $c=f(\varphi,\Delta T)$ to control the valve opening, e.g. a lower and an upper threshold value $L_L$, $L_H$ for the flow-per-temperature ratio $$\frac{\varphi}{\Delta T}.$$

using the lower and upper slope threshold values $K_L$, $K_H$. Herein, the term "flow-per-temperature ratio" is used as an abbreviated form of the term "flow-per-temperature-difference ratio" or "flow-per-delta-temperature ratio"

$$\frac{\varphi}{\Delta T},$$

Figure 8A:
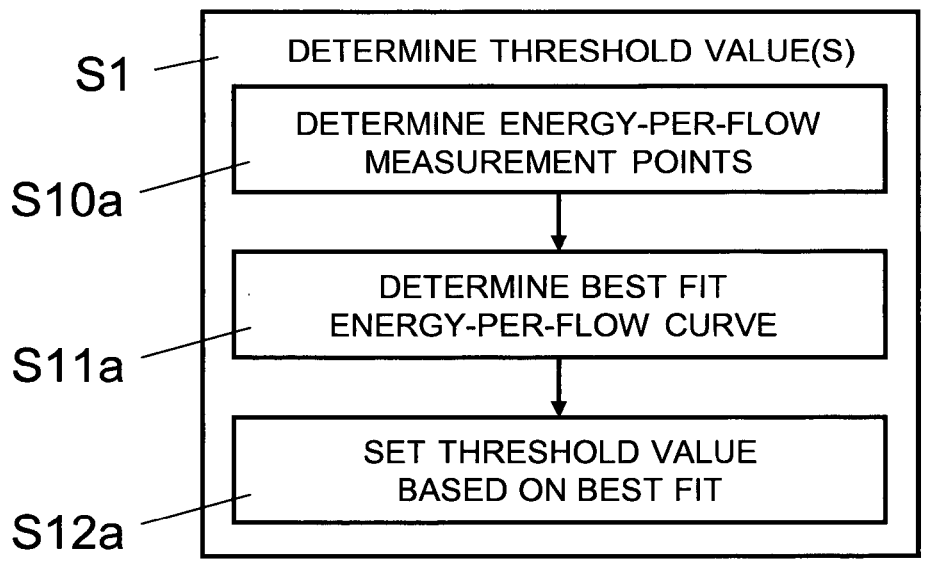
FIG. 8a: shows a flow diagram illustrating an exemplary sequence of steps for determining threshold values used for controlling the opening of the valve.
Figure 8B:
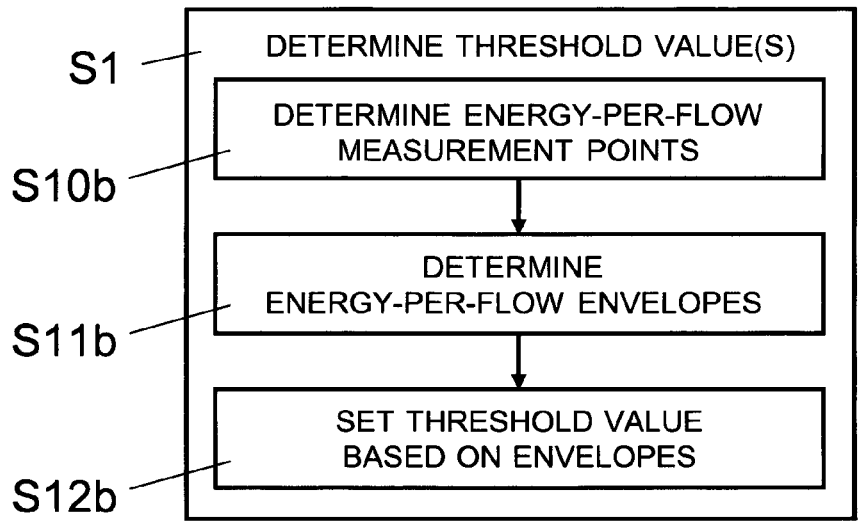
FIG. 8b: shows a flow diagram illustrating an exemplary sequence of steps for determining threshold values used for controlling the opening of the valve.
Figure 14:
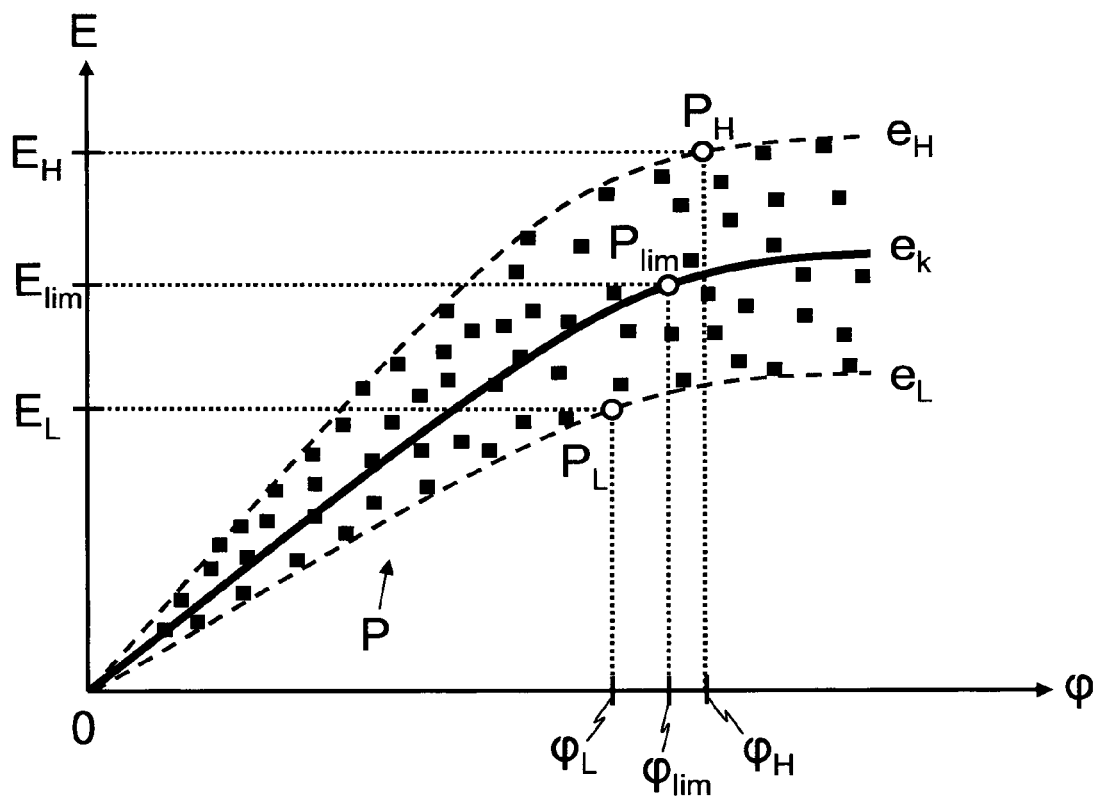
FIG. 14: shows a graph illustrating an example with a plurality of energy-per-flow measurements and a respective best fit energy-per-flow curve as well as a high energy-per-flow envelope and a low energy-per-flow envelope used to determine threshold values for controlling the opening of the valve.

In the embodiments illustrated in FIGS. 8a and 8b, for determining the threshold value(s) for controlling the valve opening, in step S10a or 10b, respectively, the processor 14 records a set of energy-per-flow measurement points P, as illustrated in FIG. 14 (black squares). This plurality of energy-per-flow measurement points P are recorded for a variety of conditions of the HVAC system 100 and its environment, including different values of flow $\varphi$ through the valve 10, supply temperature $T_{in}$, return air temperature $T_{out}$, air temperature $T_{air}$ in the space around the heat exchanger 2, air flow $\varphi$ across the heat exchanger 2, and air humidity $H_{air}$ across the heat exchanger 2.

As illustrated in FIG. 8a, in step S11a, the processor 14 determines the best fit energy-per-flow curve $e_k$ for the plurality of energy-per-flow measurement points P. Subsequently, in step S12a, the processor 14 calculates the threshold value L for the control criterion, e.g. the flow-per-temperature ratio $$\frac{\varphi}{\Delta T},$$

based on the best fit energy-per-flow curve $e_k$. Specifically, the processor 14 determines for the best fit energy-per-flow curve $e_k$, or for the normalized best fit energy-per-flow curve $$\dot{e}_k = \frac{e_k}{E_{max}}$$

(where $E_{max}$ is the asymptotic value of $E(\varphi)$ as illustrated in FIG. 12), the first derivative $e'_k$ or $\dot{e}'_k$ respectively. As described above with reference to FIGS. 12 and 13, the processor 14 further determines from the first derivative $e'_k$, $\dot{e}'_k$ the flow $\varphi_{lim}$ where the slope threshold value is reached, e.g. for a heat exchanger 2 $e'_k=K_{lim}$ or $\dot{e}'_k=C$. Correspondingly, for a chiller 5, the lower slope threshold value $K_L$ (or D) and the upper slope threshold value $K_H$ (or C) are used. As explained above with reference to FIGS. 12 and 13, the slope threshold value or the determined flow threshold $\varphi_{lim}$, respectively, determines on the best fit energy-per-flow curve $e_k$ the point $P_{lim}$ with an amount of energy $E_{lim}$ exchanged by the thermal energy exchanger 2 and a corresponding temperature difference $\Delta T = \Delta T_{lim}$. Using the threshold values $\varphi_{lim}$ and $\Delta T_{lim}$, the processor 14 calculates the threshold value for the control criterion $c=f(\varphi,\Delta T)$, e.g. the threshold value $$L = \frac{\varphi_{lim}}{\Delta T_{lim}}$$

for the flow-per-temperature ratio $$\frac{\varphi}{\Delta T}.$$

As illustrated in FIG. 8b, in step S11b, the processor 14 determines upper and lower envelopes $e_H$, $e_L$ for the plurality of energy-per-flow measurement points P. Subsequently, in step S12b, the processor 14 calculates the threshold value for the control criterion $c=f(\varphi,\Delta T)$, e.g. the threshold value L for the flow-per-temperature ratio $$\frac{\varphi}{\Delta T},$$

based on the upper and lower envelopes $e_H$, $e_L$. For example, the processor 14 determines for the upper and lower envelopes $e_H$, $e_L$, or for the normalized envelopes $$\dot{e}_H = \frac{e_H}{E_{max\,H}},$$

$$\dot{e}_L = \frac{e_L}{E_{max\,L}}$$

(where $E_{max\,H}$, $E_{max\,L}$ are the asymptotic values of $e_H$, $e_L$ or $\dot{e}_H$, $\dot{e}_L$), the respective flows $\varphi_L$, $\varphi_H$ where the slope threshold value is reached, as described above with reference to FIG. 8a for the best fit energy-per-flow curve $e_k$. The determined flow thresholds $\varphi_L$, $\varphi_H$ determine on the envelopes $e_L$, $e_H$ the points $P_L$, $P_H$ with an amount of energy $E_L$, $E_H$ exchanged by the thermal energy exchanger 2 and a corresponding temperature difference $\Delta T_L$, $\Delta T_H$. Using the threshold values $\varphi_L$, $\varphi_H$ and $\Delta T_L$, $\Delta T_H$, the processor 14 calculates the threshold value for the control criterion $c=f(\varphi,\Delta T)$, e.g. the threshold value L for the flow-per-temperature ratio $$\frac{\varphi}{\Delta T},$$

e.g. $L = \frac{\varphi_L + \varphi_H}{\Delta T_L + \Delta T_H}$, $L = \frac{\varphi_L \cdot \varphi_H}{\Delta T_L \cdot \Delta T_H}$, $L = \frac{\varphi_L}{\Delta T_L}$ or $L = \frac{\varphi_H}{\Delta T_H}$.

As illustrated in the example of FIG. 2, in step S31, the processor 14 determines as the control criterion the flow-per-temperature ratio $$c = f(\varphi, \Delta T) = \frac{\varphi}{\Delta T}.$$

In step S32, the processor 14 controls the opening of the valve 10, in response to control signals s received from the building control system 4 to meet demands requested by the building control system 4, depending on the flow-per-temperature ratio $$\frac{\varphi}{\Delta T}.$$

In an embodiment, an adaptive control criterion $c=f(\varphi, \Delta T)=f(\varphi^\alpha, \Delta T^{\beta'})$ is calculated that further depends on adjustment parameters $\alpha$, $\beta'$. The adjustment parameters $\alpha$, $\beta'$ are defined depending on environmental characteristics such as air temperature $T_{air}$, air flow $\varphi_{air}$, and air humidity $H_{air}$ in the space occupied by the thermal energy exchanger. In an embodiment, the parameters $\alpha$, $\beta'$ are defined by the processor 14 depending on the upper and lower envelopes $e_H$, $e_L$ or the normalized envelopes $\dot{e}_H$, $\dot{e}_L$, e.g. depending on the respective threshold values $\varphi_L$, $\varphi_H$ and $\Delta T_L$, $\Delta T_H$. Accordingly, the processor 14 is configured to control the opening of the valve 10 depending on environmental characteristics such as air temperature $T_{air}$, air flow $\varphi_{air}$, and air humidity $H_{air}$, and/or depending on the supply temperature $T_{in}$. For example, in the case that the normalized envelopes $\dot{e}_H$, $\dot{e}_L$ have a corresponding shape, i.e. they have essentially an equal form, the adjustment parameters are set to $\alpha=1-\epsilon$ and $\beta'=-\epsilon$, whereby $\epsilon$ is a small value, e.g. $\epsilon<0.1$, which results in a control criterion $$c = f(\varphi^{1-\epsilon}, \Delta T^{-\epsilon}) = f\left(\frac{\varphi^{1-\epsilon}}{\Delta T^\epsilon}\right)$$

that mainly depends on and limits the flow $\varphi$; whereas, for the case where the normalized envelopes $\dot{e}_H$, $\dot{e}_L$ do not have a corresponding shape, i.e. they have a different form, the adjustment parameters are set to $\alpha=\epsilon$ and $\beta'=\epsilon-1$ which results in a control criterion $$c = f(\varphi^\epsilon, \Delta T^{\epsilon-1}) = f\left(\frac{\varphi^\epsilon}{\Delta T^{1-\epsilon}}\right)$$

that mainly depends on a reciprocal value of the temperature difference $\Delta T$. Typically, the adjustment parameters are set to values $\alpha>0$ and $\beta'<0$, resulting in an adaptive flow-per-temperature ratio $$c = \frac{\varphi^\alpha}{\Delta T^{-\beta'}} = \frac{\varphi^\alpha}{\Delta T^{|\beta'|}}$$

as the control criterion, as summarized in Table 2 below.

TABLE 2

| | $\alpha > 0$ and $\beta' < 0$ | | | |
|---|---|---|---|---|
| Exclusive flow limitation | Identical form of the normalized envelopes $\dot{e}_H$, $\dot{e}_L$ | Intermediary range | Different form of the normalized envelopes $\dot{e}_H$, $\dot{e}_L$ | Exclusive $\Delta T$ limitation |
| $\alpha = 1$ $\beta' = 0$ | $\alpha = 1 - \epsilon$ $\beta' = -\epsilon$ | $(\alpha = 1 - \epsilon \ldots \alpha = \epsilon)$ $(\beta' = -\epsilon \ldots \beta' = \epsilon - 1)$ | $\alpha = \epsilon$ $\beta' = \epsilon - 1$ | $\alpha = 0$ $\beta' = -1$ |
| $c = f(\varphi)$ | $c = f\left(\frac{\varphi^{1-\epsilon}}{\Delta T^\epsilon}\right)$ | $c = \frac{\varphi^\alpha}{\Delta T^{|\beta'|}}$ | $c = f\left(\frac{\varphi^\epsilon}{\Delta T^{1-\epsilon}}\right)$ | $c = f\left(\frac{1}{\Delta T}\right)$ |

From hereon, when the notation $$c = \frac{\varphi^\alpha}{\Delta T^\beta}$$

is used for simplicity, assumed values for the adjustment parameters are $\alpha>0$ and $\beta>0$ in this notation, where $\beta=-\beta'$.

Although the following examples are described specifically for the flow-per-temperature ratio $$\frac{\varphi}{\Delta T} \left(\text{or } \frac{\varphi^\alpha}{\Delta T^\beta}\right)$$

as control criterion, one skilled in the art will understand that other control criteria $c=f(\varphi,\Delta T)$ or $c=f(\varphi^\alpha, \Delta T^\beta)$, could be used instead, without deviating from the scope of the claims, provided that for the function $c=f(\varphi,\Delta T)$ to produce a constant value for the control criterion c with an increasing value of the temperature difference $\Delta T$, the value of the flow $\varphi$ must increase also. For example, also a logarithmic function $$c = f(\varphi, \Delta T) = \log\left(\frac{\varphi}{\Delta T}\right) \text{ or } c = \log\left(\frac{\varphi^\alpha}{\Delta T^\beta}\right),$$

respectively, would satisfy the condition that with an increase of the value of the temperature difference $\Delta T = T_{in} - T_{out}$, the value of the flow $\varphi$ must increase also, for the control criterion c to be constant. One skilled in the art will understand that corresponding conditions could be stated for decreasing values, where a decreasing value of the temperature difference $\Delta T$ would have to be accompanied by a "corresponding" decrease of the value of the flow $\varphi$, for the control criterion c to remain constant. Moreover, various constants could be included in the calculation of the control criteria $c = f(\varphi, \Delta T)$, without deviating from the scope of the claims.

Figure 3:
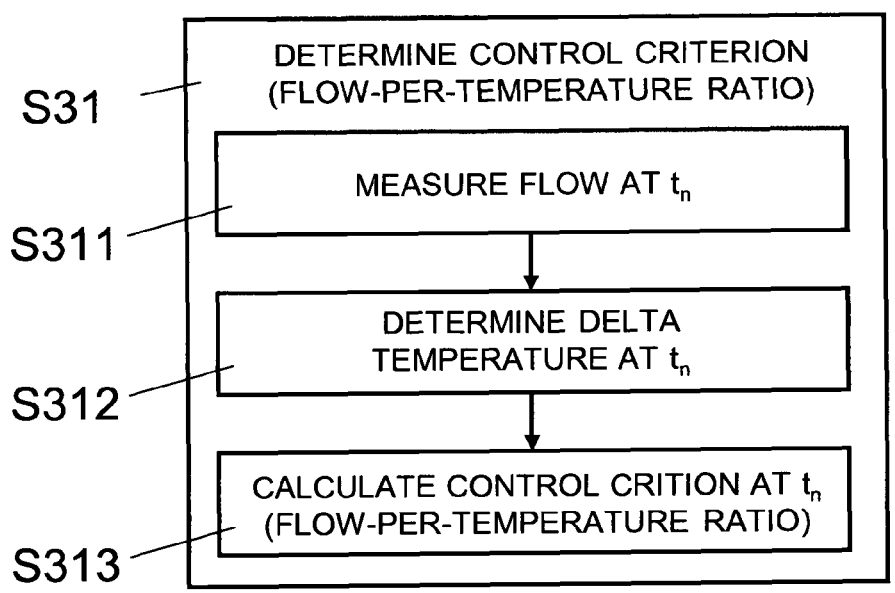
FIG. 3: shows a flow diagram illustrating an exemplary sequence of steps for determining the flow-per-temperature ratio of the thermal energy exchanger.

As illustrated in FIG. 3, for determining the flow-per-temperature ratio $$\frac{\varphi}{\Delta T} \left(\text{or } \frac{\varphi^\alpha}{\Delta T^\beta}\right),$$

in step S311, the processor 14 determines the flow $\varphi_n$ through the valve 10 at a defined time $t_n$. Depending on the embodiment, the processor 14 determines the flow $\varphi_n$ by sampling, polling or reading the flow sensor 13 at the defined time $t_n$, or by reading a data store containing the flow $\varphi_n$ measured by the flow sensor 13 at the defined time $t_n$.

In step S312, the processor 14 determines the temperature difference $\Delta T$ between the supply temperature $T_{in}$ and the return temperature $T_{in}$ at the defined time $t_n$.

Figure 4:
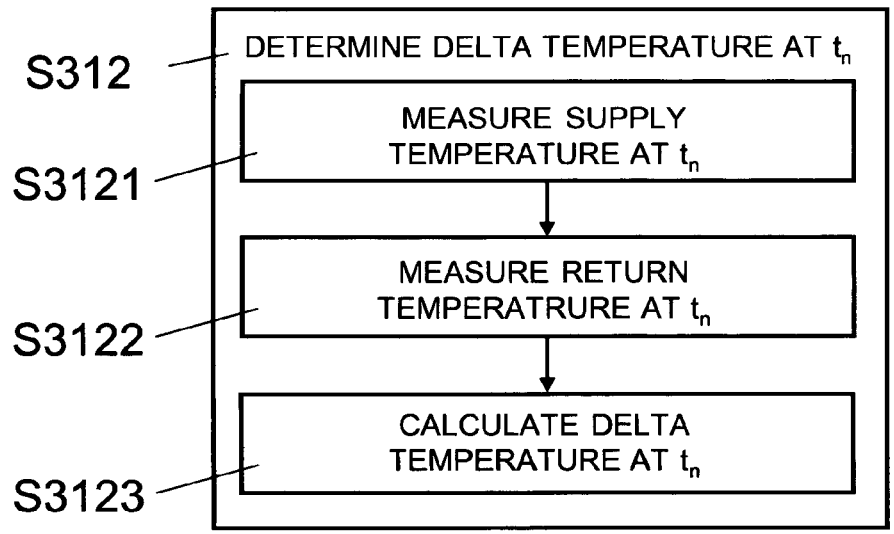
FIG. 4: shows a flow diagram illustrating an exemplary sequence of steps for determining the temperature difference between the supply temperature to and the return temperature from the thermal energy exchanger at a given point in time.

As illustrated in FIG. 4, for determining the temperature difference $\Delta T$, in steps S3121 and S3122, the processor 14 determines the supply and return temperatures $T_{in}$, $T_{out}$, measured by the temperature sensors 21, 22, respectively, at the defined time $t_n$. Depending on the embodiment, the processor 14 determines the supply and return temperatures $T_{in}$, $T_{out}$ by sampling, polling or reading the temperature sensors 21, 22 at the defined time $t_n$, or by reading a data store containing the input and return temperatures $T_{in}$, $T_{out}$ measured by the temperature sensors 21, 22 at the defined time $t_n$. In step S3123, the processor 14 calculates the temperature difference $\Delta T = T_{in} - T_{out}$ between the supply temperature $T_{in}$ and the return temperature $T_{out}$.

In step S313 (FIG. 3), the processor 14 calculates the flow-per-temperature ratio $$\frac{\varphi}{\Delta T} \left(\text{or } \frac{\varphi^\alpha}{\Delta T^\beta}\right)$$

for the defined time $t_n$.

FIG. 12 illustrates the amount of energy $E_n = \Delta T \cdot \varphi_n$ (specifically, $E_0$, $E_{n-1}$, $E_n$, $E_{n+1}$, $E_{lim}$) exchanged by the thermal energy exchanger 2 for the respective flow $\varphi_n$ (specifically, $\varphi_0$, $\varphi_{n-1}$, $\varphi_n$, $\varphi_{n+1}$, $\varphi_{lim}$) and temperature difference $\Delta T_n$ (specifically, $\Delta T_0$, $\Delta T_{n-1}$, $\Delta T_n$, $\Delta T_{n+1}$, $\Delta T_{lim}$), as illustrated correspondingly in FIG. 13, and as measured, for instance, at specific points in time $t_n$ (specifically, $t_0$, $t_{n-1}$, $t_n$, $t_{n+1}$).

Figure 5:
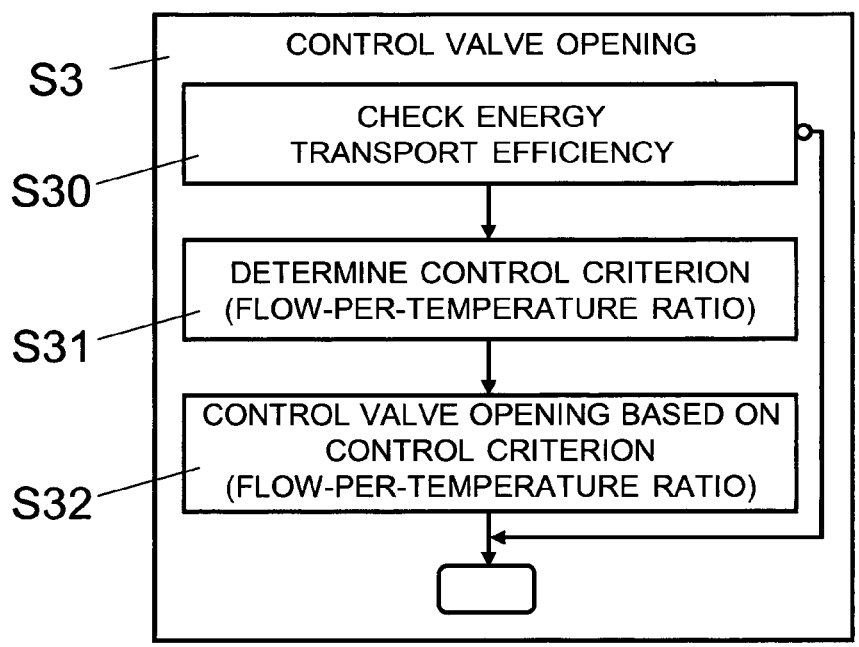
FIG. 5: shows a flow diagram illustrating an exemplary sequence of steps for controlling the opening of the valve including the checking of the efficiency of energy transport in the fluid circuit.

In the embodiment according to FIG. 5, before the flow-per-temperature ratio $$\frac{\varphi}{\Delta T} \left(\text{or } \frac{\varphi^\alpha}{\Delta T^\beta}\right)$$

is determined in step S31, the processor 14 checks the energy transport efficiency in step S30 and, subsequently, controls the opening of the valve 10 depending on the energy transport efficiency. If the energy transport efficiency is sufficient, processing continues in step S31; otherwise, further opening of the valve 10 is stopped and/or the opening of the valve 10 is reduced, e.g. by reducing the control signal Z by a defined decrement.

Figure 6:
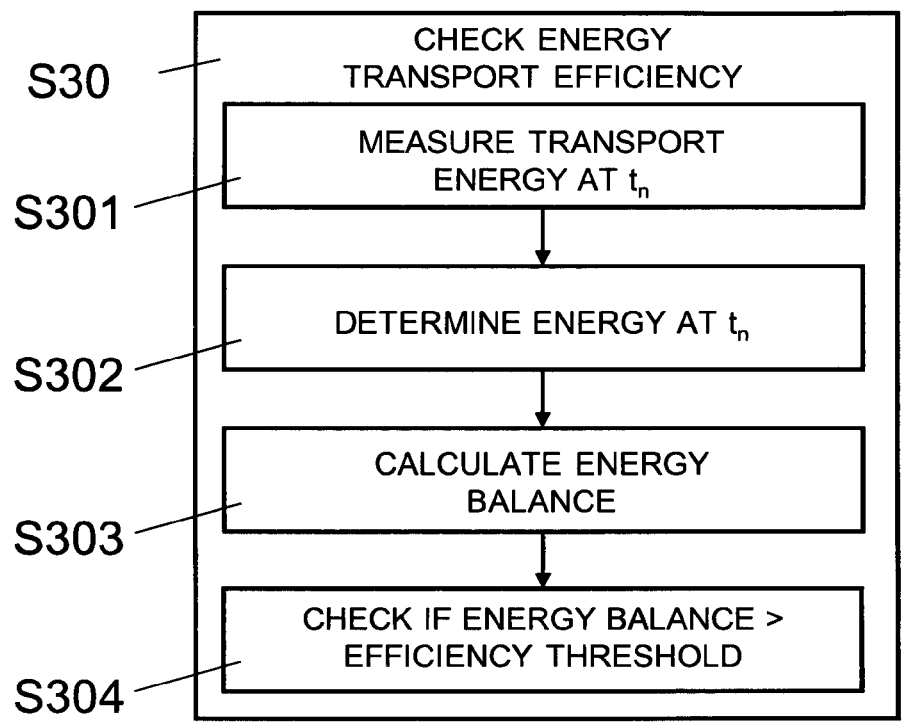
FIG. 6: shows a flow diagram illustrating an exemplary sequence of steps for checking the efficiency of the energy transport in the fluid circuit.

As is illustrated in FIG. 6, for checking the energy transport efficiency, in step S301 the processor 14 determines the transport energy $E_T$ used by the pump 3 to transport the fluid through the fluid circuit 101 to the thermal energy exchanger 2. Depending on the embodiment, the processor 14 determines the transport energy $E_T$ by polling or reading the energy measurement unit 31 at a defined time $t_n$, or by reading a data store containing the transport energy $E_T$ measured by the energy measurement unit 31 at a defined time $t_n$.

In step S302, the processor 14, determines the amount of energy $E_n$ exchanged by the thermal energy exchanger 2 at the defined time $t_n$.

In step S303, the processor 14 calculates the energy balance $E_B = E_n - E_T$ from the determined transport energy $E_T$ and amount of exchanged energy $E_n$.

In step S304, the processor 14 checks the energy transport efficiency by comparing the calculated energy balance $E_B$ to an efficiency threshold $K_E$. For example, the energy efficiency is considered positive, if the energy balance $E_B$ exceeds the efficiency threshold $E_B > K_E$, e.g. $K_E = 0$. Depending on the embodiment, the efficiency threshold $K_E$ is a fixed value stored in the control device 1 or entered from an external source.

As illustrated in FIG. 7, step S3 for controlling the valve opening is further preceded by optional step S2 for calibrating the control signal Z values for controlling the actuator 11 to open and/or close the valve 10.

Figure 9:
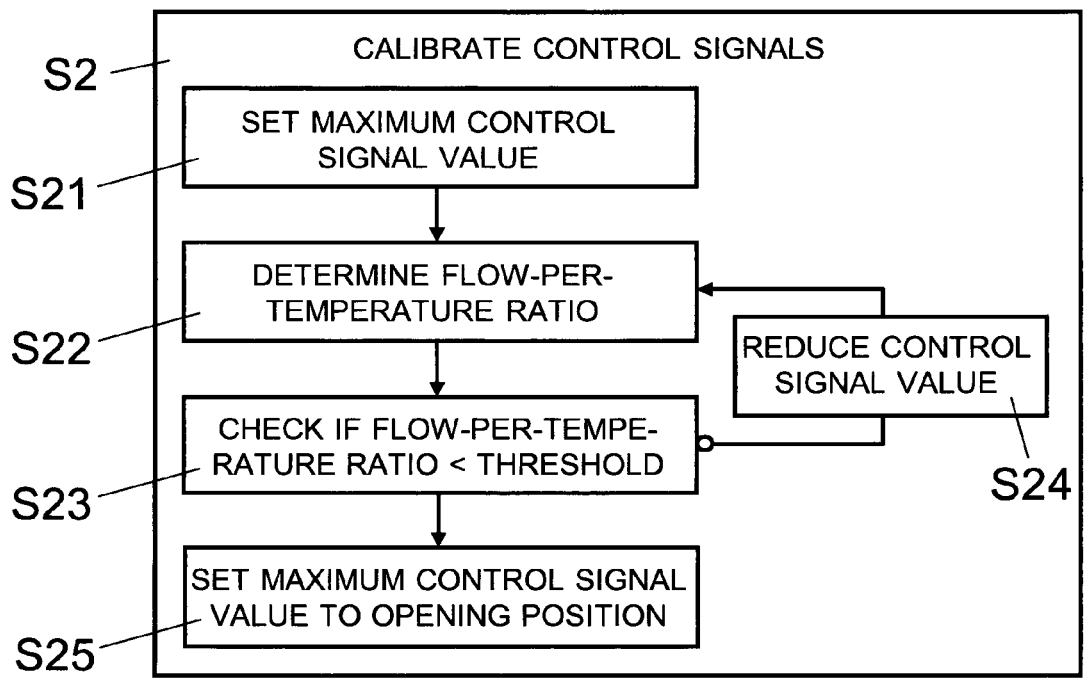
FIG. 9: shows a flow diagram illustrating an exemplary sequence of steps for calibrating control signals used for controlling an actuator of the valve.

As illustrated in FIG. 9, for calibrating the values of the control signal Z, in step S21, the processor 14 sets the control signal Z to a defined maximum control signal value $Z_{max}$, e.g. 10V. Accordingly, in the calibration phase, the actuator 11 drives the valve 10 to a maximum opening position, e.g. to a fully open position with maximum flow $\varphi_{max}$ corresponding to a maximum BTU (British Thermal Unit).

In step S22, the processor 14 determines the flow-per-temperature ratio $$\frac{\varphi}{\Delta T} \left(\text{or } \frac{\varphi^\alpha}{\Delta T^\beta}\right)$$

as described above with reference to FIG. 3 for the current valve opening.

In step S23, the processor 14 checks if the determined flow-per-temperature ratio $$\frac{\varphi}{\Delta T} \left(\text{or } \frac{\varphi^\alpha}{\Delta T^\beta}\right)$$

is smaller than the defined threshold L. If $$\frac{\varphi}{\Delta T} < L \left(\text{or } \frac{\varphi^\alpha}{\Delta T^\beta} < L\right),$$

processing continues in step S25; otherwise, if $$\frac{\varphi}{\Delta T} \geq L \left(\text{or } \frac{\varphi^\alpha}{\Delta T^\beta} \geq L\right),$$

processing continues in step S24.

In step S24, the processor 14 reduces the valve opening, e.g. by reducing the control signal Z by a defined decrement, e.g. by 0.1V, to a lower control signal level $Z_{n+1}$, $Z_n$, and continues by determining the flow-per-temperature ratio $$\frac{\varphi}{\Delta T} \left(\text{or } \frac{\varphi^\alpha}{\Delta T^\beta}\right)$$

for the reduced opening of the valve 10 with reduced flow $\varphi_{n+1}$, $\varphi_n$.

In step S25, when the valve 10 is set to an opening where the flow-per-temperature ratio $$\frac{\varphi}{\Delta T} \left(\text{or } \frac{\varphi^\alpha}{\Delta T^\beta}\right)$$

is below the defined threshold L, e.g. for a control signal $Z_n$ with flow $\varphi_n$, the processor 14 calibrates the control signal Z by assigning the maximum value for the control signal $Z_{max}$ to the current opening level of the valve 10. For example, if $$\frac{\varphi}{\Delta T} < L \left(\text{or } \frac{\varphi^\alpha}{\Delta T^\beta} < L\right)$$

is reached with a control signal $Z_n$ of 8V at an opening level of the valve 10 of 80% with flow $\varphi_n$, the maximum value $Z_{max}$ of e.g. 10V for the control signal Z is assigned to the opening level of 80%. When the control signal Z is subsequently set to its maximum level $Z_{max}$, e.g. as required by a load demand from the building control system 4, the valve 10 is set to an opening level with flow $\varphi_n$ that results in a flow-per-temperature ratio $$\frac{\varphi}{\Delta T} \left(\text{or } \frac{\varphi^\alpha}{\Delta T^\beta}\right)$$

smaller than the defined threshold value L.

Figure 10:
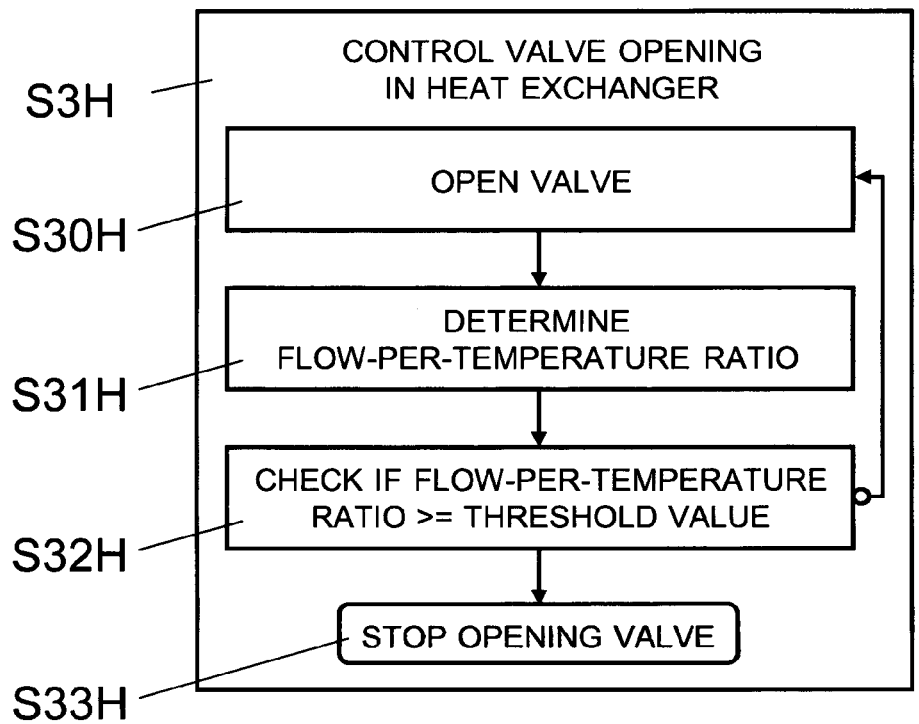
FIG. 10: shows a flow diagram illustrating an exemplary sequence of steps for controlling the opening of the valve in a fluid circuit with a heat exchanger.

FIG. 10 illustrates an exemplary sequence of steps S3H for controlling the valve opening for a thermal energy converter 2 in the form of a heat exchanger.

In step S30H, the processor 14 opens the valve 10 from an initial closed position. Specifically, in this initial phase, the valve 10 is opened to a defined opening level and/or by a defined increment of the value of the control signal Z, e.g. in response to control signals s received from the building control system 4 to meet demands requested by the building control system 4.

In step S31H, the processor 14 determines the flow-per-temperature ratio $$\frac{\varphi}{\Delta T} \left(\text{or } \frac{\varphi^\alpha}{\Delta T^\beta}\right)$$

as described above with reference to FIG. 3 for the current valve opening.

In step S32H, the processor 14 checks whether the determined flow-per-temperature ratio $$\frac{\varphi}{\Delta T} \left(\text{or } \frac{\varphi^\alpha}{\Delta T^\beta}\right)$$

is equal to or greater than the defined threshold L.

If the flow-per-temperature ratio $$\frac{\varphi}{\Delta T} \left(\text{or } \frac{\varphi^\alpha}{\Delta T^\beta}\right)$$

is smaller than the defined threshold L, processing continues in step S30H by continuing to increase the control signal Z to further open the valve 10, as required e.g. by the control signals s received from the building control system. Otherwise, if the flow-per-temperature ratio $$\frac{\varphi}{\Delta T} \left(\text{or } \frac{\varphi^\alpha}{\Delta T^\beta}\right)$$

is equal to or greater than the defined threshold L, processing continues in step S33H by stopping further opening of the valve 10 and/or by reducing the opening of the valve 10, e.g. by reducing the control signal Z by a defined decrement, as the heat exchanger no longer operates in the efficient range, and maintaining the opening of the valve 10 until a reduction is demanded, e.g. by the building control system 4.

Figure 11:
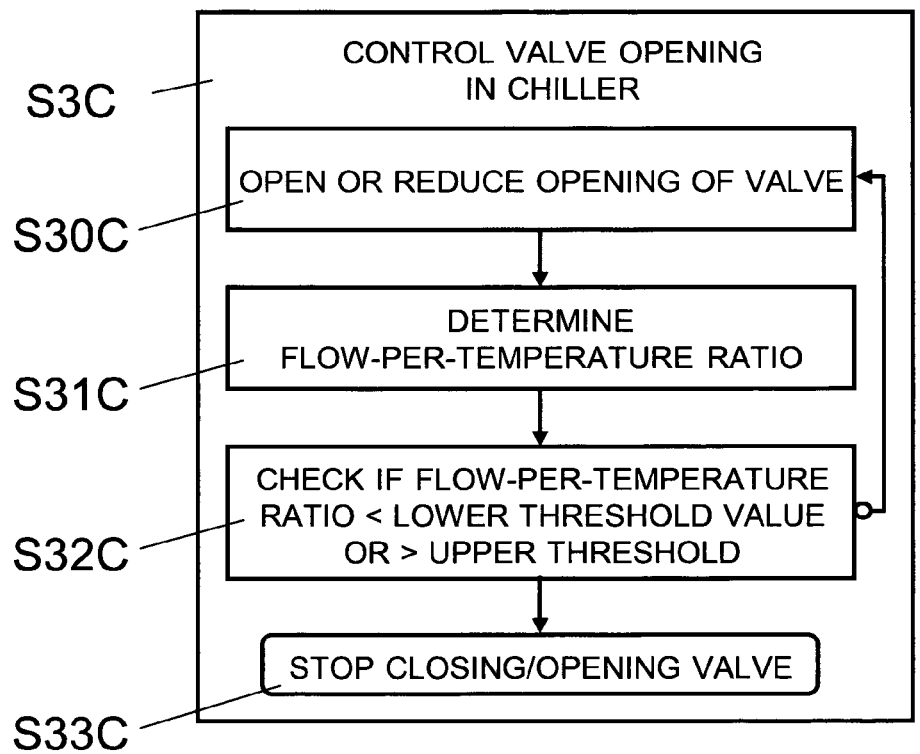
FIG. 11: shows a flow diagram illustrating an exemplary sequence of steps for controlling the opening of the valve in a fluid circuit with a chiller.

FIG. 11 illustrates an exemplary sequence of steps S3C for controlling the valve opening for a thermal energy converter in the form of a chiller 5.

In step S30C, the processor 14 opens the valve 10 from an initial closed position or reduces the opening from an initial open position. Specifically, in this initial phase, the valve 10 is opened or its opening is reduced, respectively, to a defined opening level and/or by a defined increment (or decrement) of the value of the control signal Z, e.g. in response to control signals s received from the building control system 4 to meet demands requested by the building control system 4.

In step S310, the processor 14 determines the flow-per-temperature ratio $$\frac{\varphi}{\Delta T} \left(\text{or } \frac{\varphi^\alpha}{\Delta T^\beta}\right)$$

as described above with reference to FIG. 3 for the current valve opening.

In step S32C, the processor 14 checks whether the determined flow-per-temperature ratio $$\frac{\varphi}{\Delta T} \left(\text{or } \frac{\varphi^\alpha}{\Delta T^\beta}\right)$$

is smaller than the defined lower threshold value $L_L$ or greater than the defined upper threshold value $L_H$.

If the flow-per-temperature ratio $$\frac{\varphi}{\Delta T}\left(\text{or } \frac{\varphi^\alpha}{\Delta T^\beta}\right)$$

is greater than the defined lower threshold $L_L$ and smaller than the upper threshold $L_H$, processing continues in step S30C by continuing to increase the control signal Z to further open the valve 10 or by continuing to decrease the control signal Z to further close the valve 10, respectively, as required e.g. by control signals s received from the building control system 4. Otherwise, if the flow-per-temperature ratio $$\frac{\varphi}{\Delta T}\left(\text{or } \frac{\varphi^\alpha}{\Delta T^\beta}\right)$$

is equal to or smaller than the defined lower threshold value $L_L$, or equal to or greater than the defined upper threshold value $L_H$, processing continues in step S33C by stopping further opening or closing of the valve 10, respectively, as the chiller 5 no longer operates in the efficient range, and maintaining the opening of the valve 10 until a reduction or increase, respectively, is demanded, e.g. by the building control system 4.

It should be noted that, in the description, the sequence of the steps has been presented in a specific order, one skilled in the art will understand, however, that the computer program code may be structured differently and that the order of at least some of the steps could be altered, without deviating from the scope of the invention.

The invention claimed is:

1. A method of controlling opening of a valve in a heating, ventilating and air conditioning (HVAC) system to regulate the flow $\varphi$ of a fluid through a thermal energy exchanger of the HVAC system and adjust the amount of energy E exchanged by the thermal energy exchanger, the method comprising:
measuring the flow $\varphi$ through the valve;
determining a temperature difference $\Delta T = T_{in} - T_{out}$ between a supply temperature $T_{in}$ of the fluid entering the thermal energy exchanger and a return temperature $T_{out}$ of the fluid exiting the thermal energy exchanger;
calculating a control criterion $$c = \frac{\varphi^\alpha}{\Delta T^\beta}$$

using the flow $\varphi$, the temperature difference $\Delta T = T_{in} - T_{out}$ and adjustment parameters $\alpha > 0$, $\beta > 0$; and
controlling the opening of the valve depending on a comparison of the control criterion $$c = \frac{\varphi^\alpha}{\Delta T^\beta}$$

to a threshold value.

2. The method of claim 1, further comprising determining the adjustment parameters $\alpha$, $\beta$ using environmental characteristics of a space having arranged therein the thermal energy exchanger, including at least one of: air temperature ($T_{air}$), air flow ($\varphi_{air}$), air humidity ($H_{air}$), and supply temperature ($T_{in}$).

3. The method of claim 1, wherein the supply temperature $T_{in}$, the return temperature $T_{out}$, and the flow $\varphi$ through the valve are measured at the same time.

4. The method of claim 1, further comprising measuring in a space having arranged therein the thermal energy exchanger at least one of: humidity and air flow; and further comprising at least one of: controlling the opening of the valve depending on at least one of: humidity and air flow, and adjusting the threshold value based on at least one of: humidity and air flow.

5. The method of claim 1, further comprising at least one of: controlling the opening of the valve depending on the supply temperature $T_{in}$, and adjusting the threshold value based on the supply temperature $T_{in}$.

6. A control device for controlling opening of a valve in a heating, ventilating and air conditioning (HVAC) system to regulate the flow $\varphi$ of a fluid through a thermal energy exchanger of the HVAC system and adjust the amount of energy E exchanged by the thermal energy exchanger, the control device comprising:
a processor configured to calculate a control criterion $$c = \frac{\varphi^\alpha}{\Delta T^\beta}$$

using a measurement of the flow $\varphi$ through the valve, a temperature difference $\Delta T = T_{in} - T_{out}$, determined between a supply temperature $T_{in}$ of the fluid entering the thermal energy exchanger and a return temperature $T_{out}$ of the fluid exiting the thermal energy exchanger, and adjustment parameters $\alpha > 0$, $\beta > 0$; and to control the opening of the valve depending on a comparison of the control criterion $$c = \frac{\varphi^\alpha}{\Delta T^\beta}$$

to a threshold value.

7. The control device of claim 6, wherein the processor is further configured to determine the adjustment parameters $\alpha$, $\beta$ using environmental characteristics of a space having arranged therein the thermal energy exchanger, including at least one of: air temperature ($T_{air}$), air flow ($\varphi_{air}$), air humidity ($H_{air}$), and supply temperature ($T_{in}$).

8. The control device of claim 6, wherein the processor is configured to calculate the control criterion from concurrent measurements of the flow $\varphi$ through the valve, the supply temperature $T_{in}$ of the fluid entering the thermal energy exchanger, and the return temperature $T_{out}$ of the fluid exiting the thermal energy exchanger.

9. The control device claim 1, wherein the processor is further configured to perform at least one of: controlling the opening of the valve depending on at least one of: humidity and air flow measured in a space having arranged therein the thermal energy exchanger, and adjusting the threshold value based on at least one of: the humidity and the air flow.

10. The control device of claim 6, wherein the processor is further configured to perform at least one of: control the opening of the valve depending on the supply temperature $T_{in}$, and adjust the threshold value based on the supply temperature $T_{in}$.

11. A computer program product comprising a non-transient computer readable medium having stored therein computer program code configured to direct a processor of a control device for controlling opening of a valve in a heating, ventilating and air conditioning (HVAC) system to regulate the flow of a fluid through a thermal energy exchanger of the HVAC system and adjust the amount of energy exchanged by the thermal energy exchanger by:

calculating a control criterion $$c = \frac{\varphi^\alpha}{\Delta T^{\beta-}}$$

using a measurement of the flow $\varphi$ through the valve, a temperature difference $\Delta T = T_{in} - T_{out}$, determined between a supply temperature $T_{in}$ of the fluid entering the thermal energy exchanger and a return temperature $T_{out}$ of the fluid exiting the thermal energy exchanger, and adjustment parameters $\alpha > 0$, $\beta > 0$; and controlling the opening of the valve depending on a comparison of the control criterion $$c = \frac{\varphi^\alpha}{\Delta T^{\beta-}}$$

to a threshold value.

12. A method of controlling opening of a valve in a heating, ventilating and air conditioning (HVAC) system to regulate the flow $\varphi$ of a fluid through a thermal energy exchanger of the HVAC system and adjust the amount of energy E exchanged by the thermal energy exchanger, the method comprising:

measuring the flow $\varphi$ through the valve:

determining a temperature difference $\Delta T = T_{in} - T_{out}$ between a supply temperature $T_{in}$ of the fluid entering the thermal energy exchanger and a return temperature $T_{out}$ of the fluid exiting the thermal energy exchanger;

calculating a control criterion $c = f(\varphi, \Delta T)$ using the flow $\varphi$ and the temperature difference $\Delta T = T_{in} - T_{out}$ and a function $f(\varphi, \Delta T)$ that requires an increase of the value of the flow $\varphi$ with an increase of the value of the temperature difference $\Delta T = T_{in} - T_{out}$ for the control criterion c to remain constant;

controlling the opening of the valve depending on a comparison of the control criterion $c = f(\varphi, \Delta T)$ to a threshold value; and calibrating control signal levels which are used to control an actuator of the valve for opening the valve, by setting the control signal to a defined maximum value for placing the valve to a maximum opening position, reducing the value of the control signal to reduce the opening of the valve while determining the control criterion, and assigning the maximum value of the control signal to the setting of the valve opening at which the control criterion becomes equal or greater than a threshold value.

13. A control device for controlling opening of a valve in a hearing, ventilating and air conditioning (HVAC) system to regulate the flow $\varphi$ of a fluid through a thermal energy exchanger of the HVAC system and adjust the amount of energy E exchanged by the thermal energy exchanger, the control device comprising:

a processor configured to calculate a control criterion $c = f(\varphi, \Delta T)$ using a measurement of the flow $\varphi$ through the valve and a temperature difference $\Delta T = T_{in} - T_{out}$, determined between a supply temperature $T_{in}$ of the fluid entering the thermal energy exchanger and a return temperature $T_{out}$ of the fluid exiting the thermal energy exchanger, and a function $f(\varphi, \Delta T)$ that requires an increase of the value of the flow $\varphi$ with an increase of the value of the temperature difference $\Delta T = T_{in} - T_{out}$ for the control criterion c to remain constant; to control the opening of the valve depending on a comparison of the control criterion $c = f(\varphi, \Delta T)$ to a threshold value, and to calibrate control signal levels which are used to control an actuator of the valve for opening the valve, by setting the control signal to a defined maximum value for placing the valve to a maximum opening position, reducing the value of the control signal to reduce the opening of the valve while determining the control criterion, and assigning the maximum value of the control signal to the setting of the valve opening at which the control criterion becomes equal or greater than a threshold value.

14. A computer program product comprising a non-transient computer readable medium having stored therein computer program code configured to direct a processor of a control device for controlling opening of a valve in a heating, ventilating and air conditioning (HVAC) system to regulate the flow of a fluid through a thermal energy exchanger of the HVAC system and adjust the amount of energy exchanged by the thermal energy exchanger by:

calculating a control criterion $c = f(\varphi, \Delta T)$ using a measurement of the flow $\varphi$ through the valve and a temperature difference $\Delta T = T_{in} - T_{out}$, determined between a supply temperature $T_{in}$ of the fluid entering the thermal energy exchanger and a return temperature $T_{out}$ of the fluid exiting the thermal energy exchanger, and a function $f(\varphi, \Delta T)$ that requires an increase of the value of the flow $\varphi$ with an increase of the value of the temperature difference $\Delta T = T_{in} - T_{out}$ for the control criterion c to remain constant;

controlling the opening of the valve depending on a comparison of the control criterion $c = f(\varphi, \Delta T)$ to a threshold value; and calibrating control signal levels which are used to control an actuator of the valve for opening the valve, by setting the control signal to a defined maximum value for placing the valve to a maximum opening position, reducing the value of the control signal to reduce the opening of the valve while determining the control criterion, and assigning the maximum value of the control signal to the setting of the valve opening at which the control criterion becomes equal or greater than a threshold value.

\* \* \* \* \*